Patented Feb. 28, 1950

2,498,712

UNITED STATES PATENT OFFICE 2,498,712

WATER-EMULSION PAINT

Laurence L. Ryden, Midland, Mich., assignor to The Dow Chemical Company, Midland, Mich., a corporation of Michigan No Drawing. Application June 27, 1946, Serial No. 679,877

5 Claims. (Cl. 260—17)

1

This invention concerns certain new water-emulsion paints.

Many of the water-emulsion paints now on the market are subject to certain disadvantages. They contain casein or other decomposable material which sometimes undergoes putrefaction under warm humid conditions with development of an objectionable odor. Also, paint films deposited therefrom are subject to abrasion for a period of about a month or so after formation of such film. Apparently, drying or other chemical changes occur for a prolonged period after formation of the film.

It is an object of this invention to provide new water-emulsion paints, which may readily be manufactured from inexpensive starting materials and which are free from the objectionable characteristics just mentioned. Other objects will be apparent from the following description of the invention.

The water-emulsion paints provided by the invention consist essentially of aqueous dispersions of a copolymer of a mixture of polymerizable unsaturated hydrocarbons, including a monovinyl aromatic hydrocarbon and between 40 and 60 mole per cent of an aliphatic conjugated diolefine, together with a pigment. Other ingredients such as a protective colloid, fillers, or plasticizers, etc., may be, and usually are, added, but are not required. It may be mentioned that aqueous dispersions of the copolymers rich in diolefine, e. g. containing from 56 to 60 mole per cent of chemically combined diolefine, tend to form tacky films if spread and dried without first being treated with a pigment or filler. The pigments and fillers, when added, appear to have a limited effect of overcoming tackiness and permit formation of tack-free films from compositions containing a copolymer which, alone, is somewhat tacky.

In order to obtain a water-emulsion paint that spreads well and dries to form a smooth, uniform, non-tacky film which adheres firmly to the supporting surfaces and which does not tend to crack, peel, or spall, it is important that the dispersed copolymer be one containing between 40 and 60 mole per cent of a diolefine in chemically combined form. Aqueous dispersions of the copolymers containing less than 40 mole per cent of chemically combined diolefine either fail to form films when dried, or upon being dried leave a hard resinous deposit that does not adhere well to the supporting surface and that tends to crack or spall. Dispersions of the copolymers containing more than 60 mole per cent of a diolefine usually form an undesirable tacky film when

2 dried. Aqueous dispersions of certain of the copolymers suitable for use in preparing the paints of this invention are disclosed in a copending application of E. L. Fiedler, Serial No. 679,879, filed concurrently herewith, now Patent 2,476,967.

Examples of copolymers which may be employed in preparing the paints are copolymers of styrene and butadiene-1,3 (hereinafter termed "butadiene"), copolymers of styrene and isoprene; copolymers of nuclear methylated styrene and butadiene; copolymers of nuclear ethylated styrene and isoprene; copolymers of styrene, butadiene and methylmethacrylate; copolymers of styrene, butadiene and vinyl chloride; or copolymers of styrene, butadiene and vinylidene chloride; etc. In all instances, it is important that the copolymer contain the diolefine in a proportion within the limits given above. When the copolymers contain polymerized compounds other than a vinyl aromatic compound and the diolefine, the vinyl aromatic compound is present in amount corresponding to at least 15 mole per cent of all monomers of which the copolymer is composed.

An aqueous dispersion of a suitable copolymer is prepared by polymerizing a mixture of the corresponding monomeric compounds, e. g. styrene and butadiene, in aqueous emulsion in accordance with known procedures. Usually, the polymerizable compounds, in relative proportions corresponding to the desired composition of the copolymeric product, are admixed with an aqueous solution of an emulsifying agent and the mixture is agitated to effect emulsification. A variety of suitable emulsifying agents, such as sodium oleate, Aquarex D (a sodium sulphate ester of higher alcohols) and sodium sulphonates of alkylated naphthalenes, biphenyls, etc., are known to the art. The emulsifying agent is usually employed in amount corresponding to from 0.5 to 5 per cent of the weight of the polymerizable organic compounds, but it may be used in smaller or larger proportions. A peroxide, such as hydrogen peroxide, potassium persulphate, or benzoyl peroxide, is usually added in amount corresponding to from 0.5 to 4 per cent of the weight of the compounds to be polymerized, but it is not required. The emulsion is heated in a closed container, usually at temperatures between 50° and 100° C. to effect polymerization. The progress and extent of the polymerization reaction may be followed by observing the decrease in pressure as the reaction progresses.

After completing the polymerization, the reactor is cooled, opened and other ingredients for formation of the paint product are added to the reaction mixture. The added ingredients comprise one or more pigments such as titanium oxide, white lead, china clay, or zinc sulphide, etc., and usually also a protective colloid such as a partially saponified polymer of vinyl acetate, or a water-soluble cellulose ether, etc. The covering power of the paint composition and the resistance to abrasion of a dried film thereof during washing of such film are dependent in part upon the relative proportions of the copolymer and pigment in the paint. Usually, the paint is prepared so as to contain from 15 to 100 parts by weight of the copolymer per 100 parts of pigment, the preferred proportion being dependent on the use to which the paint is to be applied. For interior purposes, a ratio of from 15 to 25 parts of copolymer per 100 parts of pigment is satisfactory. For exterior purposes, between 25 and 35 parts of copolymer are usually employed per 100 parts of pigment. An antioxidant, such as an aromatic secondary amine, a polyhydric phenol, or an aldehyde-amine condensation product, may also be added in amount corresponding to from 0.5 to 1.5 per cent of the weight of the copolymers. Paint driers, fillers and other conventional paint ingredients may be added, if desired.

The paint is usually prepared, as just described, in the form of a concentrated aqueous dispersion of from 40 to 65 per cent solids content. It may be diluted to a desired concentration with water and be applied in usual ways, e. g. by brushing, dipping, or spraying, to surfaces of wood, metal, or masonry, etc. It dries rapidly to leave a smooth, uniform film on the treated surface. The paint film thus formed is resistant to abrasion during washing and is not susceptible to putrefaction. It adheres well to most treated surfaces and is satisfactorily resistant to marring.

The following examples describe certain ways in which the principle of the invention has been applied, but are not to be construed as limiting its scope.

*Example 1*

An aqeous colloidal dispersion containing approximately 45 per cent by weight of a copolymer of approximately 43.8 mole per cent of styrene and 56.2 mole per cent of butadiene was prepared by admixing corresponding amounts of styrene and butadiene with an aqueous solution consisting of approximately 99.62 per cent of water, 0.16 per cent of potassium persulphate, 0.13 per cent of Aquarex D (the sodium sulphate esters of a mixture of higher alcohols), and 0.09 per cent of sodium bicarbonate. The butadiene was introduced into the reaction vessel under a pressure sufficient to liquefy the same. The mixture was agitated to effect emulsification and then heated at a temperature of 95° C. with continued agitation until the decrease in vapor pressure, resulting principally from consumption of the butadiene in the polymerization reaction, was nearly complete. The reaction vessel was then cooled, the pressure released, and the resultant aqueous copolymer dispersion was removed.

A mixture of 30 parts by weight of Dawson clay, 60 parts of lithopone and 10 parts of titanium oxide was wetted with 35 parts of an aqueous methyl cellulose solution of 4 per cent concentration. The resultant mixture was admixed with 55 parts of the aqueous copolymer solution, prepared as in the preceding paragraph. There were then added 1 part by weight of monoethanolamine oleate, 1 part of ethyl alcohol, 0.4 part of sodium salts of chlorinated phenol, and 0.33 part of pine oil. The mixture was stirred and passed through a paint mill to obtain a substantially uniform white paste suitable for marketing. Prior to application in painting surfaces, the paste is diluted with about half its volume of water.

*Example 2*

An aqueous colloidal dispersion containing about 45 per cent by weight of a copolymer of 55.7 mole per cent of butadiene, 29 mole per cent of styrene, and 15.3 mole per cent of vinylidene chloride was prepared by polymerizing an aqueous emulsion of the monomeric compounds in accordance with the procedure described in Example 1. A 204 gram portion of the dispersion was treated with 20 grams of an aqueous sodium silicate solution having a specific gravity at room temperature of 1.4, 2 grams of Agerite Resin D (i. e. polymerized trimethyldihydroquinoline), and 4 grams of monoethanolamine oleate. A paste of 263 grams of china clay, 75 grams of titanium oxide, 38 grams of lithopone, and 188 grams of water, was added. The resultant composition was passed through a paint mill. A thick, uniform, white paint was obtained. Prior to use, this paint is diluted by adding from 5 to 10 per cent by volume of water. It spreads well and dries rapidly to form a tightly adhering uniform paint film of good quality.

Other modes of applying the principle of the invention may be employed instead of those explained, change being made as regards the compositions herein desclosed, provided the ingredient or ingredients stated by any of the following claims or the equivalent of such stated ingredient or ingredients be employed.

I therefore particularly point out and distinctly claim as my invention:

1. A paint comprising an aqueous colloidal dispersion of a polymer composed of a mixture of polymerizable unsaturated hydrocarbons, including at least 15 mole per cent of a monovinyl aromatic hydrocarbon of the benzene series and between 56 and 60 mole per cent of an aliphatic conjugated diolefine of the class consisting of butadiene and isoprene, chemically combined with one another, a pigment added to and admixed with the aqueous dispersion of the polymer, an emulsifying agent and a protective colloid, the polymer being present in amount corresponding to from 15 to 100 per cent of the weight of the pigment.

2. A paint, as described in claim 1, wherein the polymer is composed of butadiene and styrene.

3. A paint, as described in claim 5, wherein the polymer is composed of butadiene, styrene and vinylidene chloride.

4. A paint, as described in claim 5, wherein the polymer is composed of butadiene, styrene and vinylidene chloride and contains, in chemically combined form, between 56 and 60 mole per cent of butadiene and at least 15 mole per cent of styrene, and the protective colloid is methyl cellulose.

5. A paint comprising an aqueous colloidal dispersion of a polymer composed of a mixture of polymerizable unsaturated organic compounds, which mixture includes as essential components at least 15 mole per cent of a monovinyl aromatic hydrocarbon of the benzene series, and between 56 and 60 mole per cent of an aliphatic conjugated diolefine of the class consisting of butadiene and isoprene, and the balance being vinylidene chloride, the polymerizable components being chemically combined with one another as the polymer, a pigment added to, and admixed with, the aqueous dispersion of the polymer, an emulsifying agent, and a protective colloid, the polymer being present in amount corresponding to from 15 to 100 per cent of the weight of the pigment.

LAURENCE L. RYDEN.

REFERENCES CITED

The following references are of record in the file of this patent:

UNITED STATES PATENTS

| Number | Name | Date |
|---|---|---|
| 2,317,858 | Soday | Apr. 27, 1943 |
| 2,335,124 | Konrad et al. | Nov. 23, 1943 |
| 2,366,313 | Browning | Jan. 2, 1945 |
| 2,418,782 | Mark et al. | Apr. 8, 1947 |